Patented Jan. 15, 1952

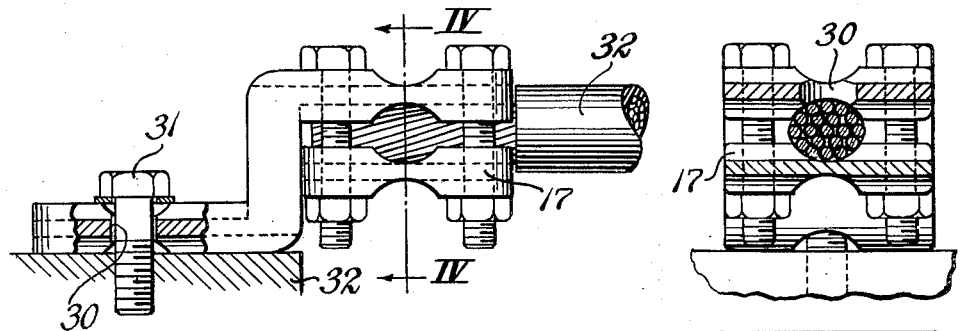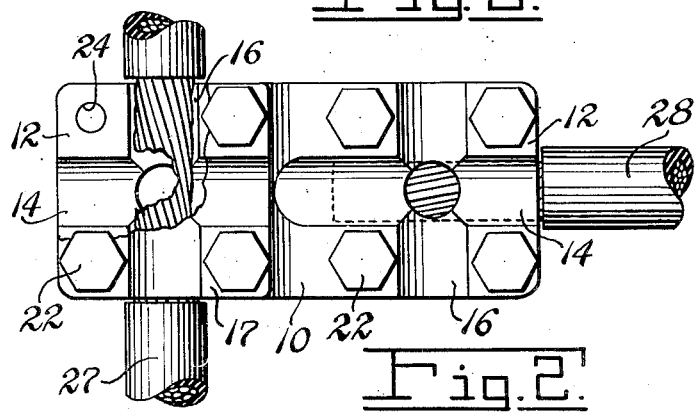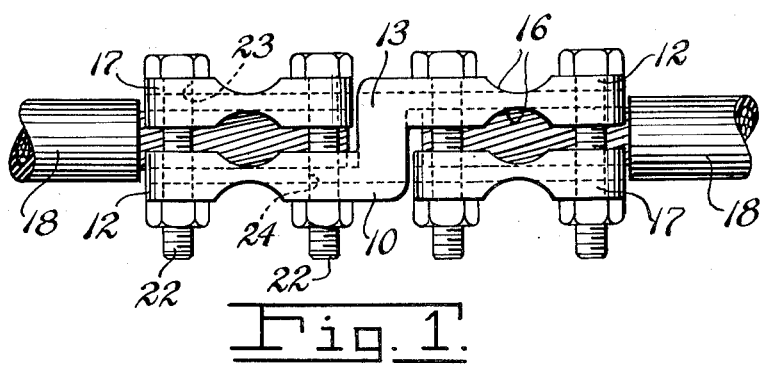

2,582,384

UNITED STATES PATENT OFFICE 2,582,384

CABLE CONNECTOR

Harry A. Knollman, Mount Orab, Ohio, assignor to Krueger and Hudepohl, Cincinnati, Ohio, a partnership Application September 1, 1950, Serial No. 182,718

4 Claims. (Cl. 287—75)

This invention relates to a cable connector for electrical cables and the like.

An object of this invention is to provide a cable connector for connecting two or more cables tandemwise with the axes of the cables in substantial alignment.

A further object of this invention is to provide a cable connector of this type with which cables can be connected tandemwise, in T fashion, or two parallel cables can be connected while retaining their parallelism.

The above and other objects and features of this invention will in part be apparent, and will in part, be obvious from the following detailed description, and the drawing, in which:

Figure 1 is a view in side elevation, showing a cable connector constructed in accordance with an embodiment of this invention, there being two cables connected tandemwise thereby;

Fig. 2 is a plan view of the cable connector illustrated in Fig. 1 showing two cables connected to form a T, part of one plate of the connector being broken away for clarity of detail;

Fig. 3 is a view in side elevation partly in section, showing a connector of similar type with one plate removed, the connector being employed as a terminal lug; and Fig. 4 is a view in section, taken along a line IV—IV in Fig. 3.

In the following detailed description, and the drawing, like reference characters indicate like parts.

As shown in Figs. 1 and 2, the cable connector of this invention includes a main member 10 which includes two flat spaced oppositely extending parallel terminal plate portions 12 and a cross bar portion 13 disposed at substantially right angles to the plate portions and connecting adjacent ends thereof. Each face of each flat portion 12 is provided with intersecting medial longitudinal and transverse grooves indicated at 14 and 16, respectively, in Fig. 2.

The grooved faces of flat portions 12 co-operate with connector plates 17 to grip cables 18. Each face of each connector plate is provided with intersecting medial longitudinal and transverse grooves indicated at 19 and 21, respectively, which are complementary to the grooves of the flat portions of the main member. The plates are mounted on the flat portions of the main member with the grooves in registry. Bolts 22, which pass through bores 23 in the corners of the plates 17 and through bores 24 in flat portions 12 draw the plates toward the flat portions of the main member to clamp the cables therebetween.

In the form of the cable connector shown in Fig. 1, the connector plates are mounted on inner or opposed faces 26 of the flat portions of main member 10. As shown, the cables may be of such diameter that the axes of the cables are substantially in alignment so that tension load on the cables will act along the axes thereof.

In Fig. 2, the same clamp assembly is shown in combination with cables 27 and 28 which meet to form a T. As shown, the cables are of such diameter that the axes of both cables fall in substantially a single plane.

In Figs. 3 and 4, one connector plate 17 is assembled with a main member 29, which is generally similar in construction to member 10, to form a terminal lug. Each flat portion of main member 29 is provided with a central bore 30. A stud 31 extends through the bore in one of the plate portions and holds one face of that plate portion against a bus bar 32 or the like. The other plate portion and the connector plate engage and grip one end of a cable 32.

The connector plates and main member may be assembled in various other ways. For example, an additional connector plate can be mounted on the outer side of one or both of the flat portions of the main member if it is desired to connect additional cables to the clamp. In addition, one or more connector plates may be mounted on the outer side of each of the connector plates or several connector plates can be mounted one on top of another.

Various other modifications of the invention will be apparent to those skilled in the art, and the cable connector described above and illustrated in the drawing is subject to structural modification without departing from either the spirit or the scope of the invention as set forth in the appended claims.

Having described my invention, what I claim as new and desire to secure by Letters Patent is:

1. A cable connector which comprises a main member having a pair of oppositely extending spaced flat parallel terminal plate portions and an integral connecting portion disposed at substantially right angles thereto and joining adjacent ends thereof, a pair of flat connector plates, each of said connector plates being on the inner side of one of said terminal portions, the inner side of each of said terminal portions having a groove extending linearly of the main member, at least one of said connector plates having a groove extending transversely of the main member, each of said connector plates having a groove opposite and complementary to each groove in the adjacent face of the terminal portion associated therewith, the ends of said grooves being unobstructed, and means for drawing each of said connector plates toward the terminal portion associated therewith, whereby the connector is adapted to grip a cable in the grooves at each end thereof, the connecting portion of the main member being of such length that the axes of the cables are in substantially the same plane.

2. A cable connector which comprises a main member having two flat oppositely extending spaced parallel terminal portions and an integral connecting portion disposed at substantially right angles thereto and joining adjacent ends thereof, a pair of flat connector plates each of substantially the same size and shape as one of the terminal portions of the main member, said connector plates being disposed on opposite faces of the terminal portions, there being complementary intersecting longitudinal and transverse grooves in the opposite faces of the terminal portions of the main member and in the adjacent faces of the connector plates, the ends of said grooves being unobstructed, and means for drawing each of the connector plates toward the terminal portion of the main member associated therewith, said complementary grooves being adapted to receive cables, whereby the cables can be clamped in said connector in parallel, crossing or substantially aligned relation.

3. A cable connector which comprises a main member having two flat oppositely extending spaced parallel terminal portions and an integral connecting portion disposed at substantially right angles thereto and joining adjacent ends thereof, a pair of flat connector plates each of substantially the same size and shape as one of the terminal portions of the main member, said connector plates being disposed on opposite faces of the terminal portions, said opposite faces of the terminal portions each having a groove extending linearly of the main member, each of said connector plates having a groove opposite and complementary to the groove in the adjacent face of the terminal portion associated therewith, the ends of said grooves remote from the connecting portion being unobstructed, and means for drawing each of said connector plates toward the terminal portion of the main member associated therewith, said complementary grooves being adapted to receive cables, whereby the connector is adapted to grip a cable in the grooves at each end thereof, the connecting portion of the main member being of such length that the axes of the cables are substantially in alignment.

4. A cable binding and splicing clamp comprising an elongate unitary member having a pair of flat parallel end portions of substantially equal size and shape joined by an intermediate portion perpendicular thereto, the end portions having opposed major faces, each of said opposed major faces being provided with intersecting medial longitudinal and transverse grooves of substantially semi-circular transverse section, a plurality of members of substantially the size and shape of one of the end portions of said unitary member, and a plurality of actuating means whereby at least one of the plurality of members is retained in coinciding opposition to each end portion of said elongate member for clamping cables in substantially co-planar relation between said members.

HARRY A. KNOLLMAN.

REFERENCES CITED

The following references are of record in the file of this patent:

UNITED STATES PATENTS

| Number | Name | Date |
|---|---|---|
| 1,392,136 | Ford | Sept. 27, 1921 |
| 1,679,028 | Gallman | July 31, 1928 |

FOREIGN PATENTS

| Number | Country | Date |
|---|---|---|
| 110,203 | Sweden | Mar. 28, 1944 |
| 334,191 | Germany | Mar. 11, 1921 |